United States Patent
Huber et al.

(10) Patent No.: US 12,531,460 B2
(45) Date of Patent: Jan. 20, 2026

(54) CONTACTING DEVICE FOR TRANSMITTING ELECTRIC CURRENTS, AND MACHINES COMPRISING SUCH A CONTACTING DEVICE

(71) Applicant: SCHUNK CARBON TECHNOLOGY GMBH, Bad Goisern (AT)

(72) Inventors: Florian Huber, Bad Ischl (AT); Markus Weber, Bad Goisern (AT); Joachim Kurz, Bad Goisern (AT); Alexander Muellegger, Bad Ischl (AT)

(73) Assignee: SCHUNK CARBON TECHNOLOGY GMBH, Bad Goisern (AT)

( * ) Notice: Subject to any disclaimer, the term of this patent is extended or adjusted under 35 U.S.C. 154(b) by 186 days.

(21) Appl. No.: 18/269,149

(22) PCT Filed: May 4, 2021

(86) PCT No.: PCT/EP2021/061743
§ 371 (c)(1),
(2) Date: Jun. 22, 2023

(87) PCT Pub. No.: WO2022/135748
PCT Pub. Date: Jun. 30, 2022

(65) Prior Publication Data
US 2024/0048031 A1 Feb. 8, 2024

(30) Foreign Application Priority Data
Dec. 23, 2020 (WO) .................. PCT/EP2020/087799

(51) Int. Cl.
*H02K 13/00* (2006.01)
*H01R 39/26* (2006.01)
*H01R 39/38* (2006.01)
*H01R 39/56* (2006.01)
*H02K 11/40* (2016.01)

(52) U.S. Cl.
CPC ........... *H02K 13/003* (2013.01); *H01R 39/26* (2013.01); *H01R 39/38* (2013.01); *H01R 39/56* (2013.01); *H02K 11/40* (2016.01); *H02K 13/006* (2013.01)

(58) Field of Classification Search
CPC .... H02K 13/003; H02K 11/40; H02K 13/006; H01R 39/26; H01R 39/38; H01R 39/56
See application file for complete search history.

(56) References Cited

U.S. PATENT DOCUMENTS

| | | | |
|---|---|---|---|
| 2,548,631 A | 4/1951 | Stapleton | |
| 2,821,664 A | 1/1958 | Weaver et al. | |
| 4,006,953 A † | 2/1977 | Moritomo | |
| 5,661,356 A * | 8/1997 | Fisher | H01R 39/12 439/29 |
| 8,624,464 B2 † | 1/2014 | Dopf | |
| 2007/0201995 A1 | 8/2007 | Harstad et al. | |
| 2010/0133951 A1 | 6/2010 | Neuweger et al. | |
| 2013/0334935 A1 | 12/2013 | Godefroy et al. | |

FOREIGN PATENT DOCUMENTS

| | | | | |
|---|---|---|---|---|
| CN | 207082977 U | 3/2018 | | |
| EP | 1300927 A1 * | 4/2003 | ............ | H01R 39/64 |
| GB | 1266622 A | 3/1972 | | |
| JP | S5790370 U | 6/1982 | | |
| JP | H01093699 A | 4/1989 | | |
| JP | H05339661 A | 12/1993 | | |
| JP | H06140117 A | 5/1994 | | |
| JP | H07135749 A | 5/1995 | | |
| JP | H10336973 A | 12/1998 | | |
| JP | 2001305896 A | 11/2001 | | |
| SU | 391670 A1 | 7/1973 | | |

OTHER PUBLICATIONS

EP-1300927-translate (Year: 2003).*
Japan Patent Office, Notice of Reasons for Rejection, Application No. 2023-538717, Apr. 1, 2025, 19 pages.
International Search Report dated Sep. 23, 2021 in connection wth PCT/EP2020/087799, 6 pgs.
International Search Report dated Sep. 21, 2021 in connection with PCT/EP2021/061743, 5 pgs.
Japan Patent Office, Notice of Reasons for Rejection, Application No. 2023-538717, Aug. 19, 2025, 13 pages.
Hajime Takagi "Electric Brushes and How to Use Them", The Carbon Society of Japan Editor, 1963 Publication of the first edition, Tokyo, Japan, 5 pages.†

\* cited by examiner
† cited by third party

*Primary Examiner* — Tulsidas C Patel
*Assistant Examiner* — Mohammed Ahmed Qureshi
(74) *Attorney, Agent, or Firm* — Quarles & Brady, LLP

(57) ABSTRACT

A contacting device for transmitting electric currents of a rotor part of a machine, said rotor part being formed by a shaft and/or slip ring, to a machine, and to the use of a discharge device, wherein the discharge device comprises a contact element for forming an electrically conductive sliding contact between a sliding contact surface of the contact element, said sliding contact surface being provided in order to form the sliding contact, and a rotor contact surface of the shaft or the slip ring, and a recess is formed in the sliding contact surface. The contact element is at least partly coated with an oily fluid, in particular at least in the region of the sliding contact surface.

19 Claims, 2 Drawing Sheets

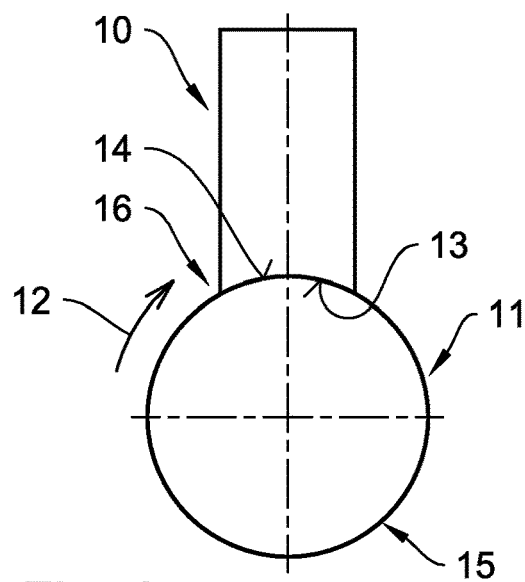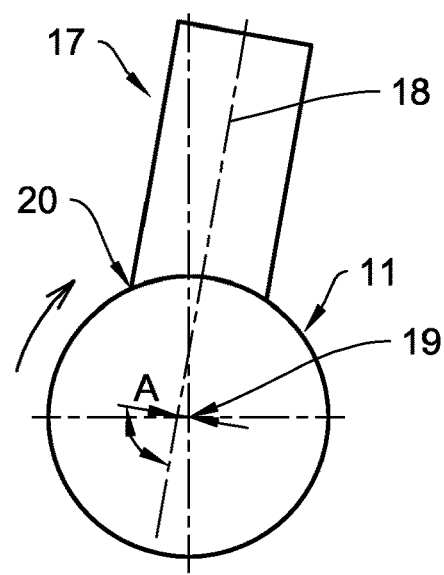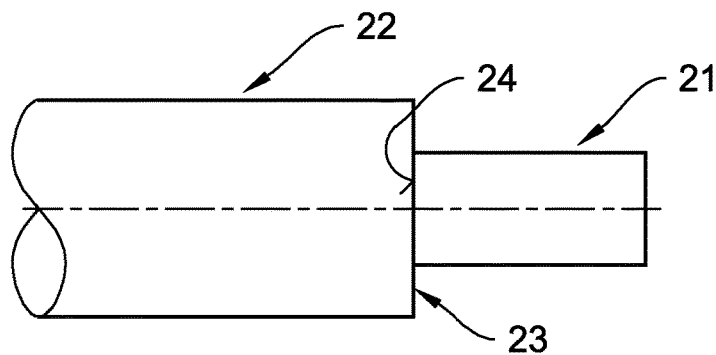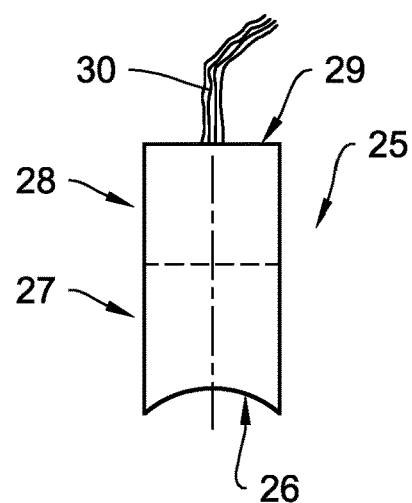
Fig. 1
Fig. 2
Fig. 3
Fig. 4

CONTACTING DEVICE FOR TRANSMITTING ELECTRIC CURRENTS, AND MACHINES COMPRISING SUCH A CONTACTING DEVICE

The present application is a national stage application filed under 35 U.S.C. § 371 of International Application No. PCT/EP2021/061743, filed May 4, 2021, which claims priority of PCT/EP2020/087799 filed Dec. 23, 2020, which applications are incorporated herein by reference in their entirety for all purposes.

The present disclosure relates to a contacting device for dissipating electrical currents from a rotor part of a machine configured with a shaft and/or a slip ring, comprising a contact element for forming an electrically conductive sliding contact between a sliding contact surface of the contact element provided for forming the sliding contact and a rotor contact surface of the shaft or of the slip ring. The disclosure further relates to a machine with such a contacting device and its use.

Such contacting devices are known in various embodiments from the prior art. In particular, it is known to use carbon brushes for conducting low-frequency currents, which brushes are arranged in an axial or radial distribution around a shaft and are contacted with a stator via pigtails. As a result of their low electrical resistance, the carbon brushes accommodated in a holding device or brush holder enable a direct dissipation or transmission of electrical currents and can thus avoid undesired current conduction via bearing points of the shaft, which can lead to surface damage to the bearing body or bearing rings as a result of spot welding. Furthermore, carbon brushes can also be used to transmit electric currents from the stator to the rotor, for example in electric motors. In this case, one or more slip rings on a shaft are then regularly contacted with a contact element. A slip ring can also be understood here as a commutator.

The term "shaft" is used in the present case as a synonym for the term "rotor part" or "axle". Therefore, the terms "shaft" are to be understood as all rotating machine parts for which a dissipation or transmission of currents in or between a fixed stator part or machine part of a machine can be accomplished.

Contacting devices are also regularly used in railway technology, where alternating currents or a working current can flow off via wheel axles. Such contacting devices are described, for example, in DE 10 2010 039 847 A1.

Measures for dissipating or transmitting currents are also required in electrical machines in general, for example for motor vehicles. In the case of motor drive shafts or gear shafts connected thereto or other functional components, continuously fluctuating AC voltages or currents and high-frequency current pulses can occur, which can also damage bearing points of a rotor shaft or gear shaft, which is why contacting devices are usually required here.

A problem with the contacting devices described and the machines having such contacting devices is the high heat generation caused by electrical and mechanical losses, which result in high thermal loads on both the contacting device and the machine (e.g.: engine, transmission). In order to get this problem under control to some extent, the heat produced has so far been removed, in particular via ventilation devices. However, the thermal load on components can only be partially minimized by means of such ventilation devices. Another disadvantage of such ventilation devices is the drastic increase in the size of the installation space, in order to integrate such ventilation devices in the relevant machines.

Furthermore, the known contacting devices or contact elements in contact with shafts, when these are installed adjacent to a bearing, for example, can easily come into contact with engine or gear oil due to the constricted installation space. As has been found, particularly in the case of a radial arrangement of the contact element on a shaft, an increased electrical resistance of the sliding contact can occur when it comes into contact with oil, which conflicts with the functioning of the contacting device.

The object of the present disclosure is to overcome the disadvantages of the prior art described above. The object of the disclosure is in particular to ensure reliable transmission of currents.

This object is achieved by a contacting device having the features of Claim 1, a machine having the features of Claim 14 and use of a contacting device having the features of Claim 19.

The contacting device according to the disclosure for the transmission of electrical currents from a rotor part of a machine configured with a shaft and/or a slip ring comprises a contact element for forming an electrically conductive sliding contact between a sliding contact surface of the contact element provided for forming the sliding contact and a rotor contact surface of the shaft or of the slip ring, wherein a recess is formed in the sliding contact surface, wherein the contact element is wetted with an oily fluid at least partially, in particular at least in the area of a sliding contact surface.

With the contacting device according to the disclosure, it is possible to safely dissipate capacitively coupled high-frequency voltages or so-called parasitic AC voltages, which are formed by electrical drives due to the power electronics used (pulse width modulation), or to transmit a current to the rotor of the electrical drive. The contacting device can also be arranged within a comparatively small installation space on the relevant shaft or on the slip ring and wetted with an oily fluid. As a result of the wetting with the oily fluid it is also possible to contain or dissipate the heat generated by the frictional contact with the shaft or the slip ring with the aid of the oily fluid. In particular, in the present disclosure a special cooling device such as a ventilation device is required to minimize the thermal load. As a result, the construction of a machine such as an electric motor, for example, can be made simpler and therefore more favourable and the cooling of the module can be more efficient than in the systems known so far. For example, there are no frictional influences due to radial shaft sealing rings, inter alia. In addition, the entire machine dimensioning can be smaller. Since the recess is formed in the region of the sliding contact surface of the contact element, floating of the contact element on the shaft or the slip ring can be prevented if an oil film, for example, is formed on the shaft in a desired or undesired manner. Any hydrodynamic effects that can occur due to the formation of a film from the oily fluid between the contact element and the shaft or the slip ring are effectively avoided by the recess. The oily fluid can then accumulate within the recess in the sliding contact surface or be displaced into the recess so that any film of the oily fluid is interrupted or configured to be only very thin. It is thus possible to form a particularly low electrical resistance of the sliding contact or between the contact element and the shaft or the slip ring. Any floating of the contact element is thus prevented and any loss of electrical contact between the shaft or the slip ring and the contact element can be avoided. The contact element can be in contact with a shaft or a slip ring on a radial side or an axial side thereof.

Usually, the oily fluid can be an engine and/or gear oil, which can usually be present in any case in the engine or transmission in which the contacting device according to the disclosure is provided.

The recess can be formed within the sliding contact surface by at least one bore or a slot. A bore in the contact element can be formed in a particularly simple manner. The hole can be a blind hole or a through hole. Even when the contact element is worn or material of the contact element is removed abrasively, with the bore it can always be ensures that a recess is present within the sliding contact surface.

Furthermore, two or more recesses can be formed within the sliding contact surface. Depending on the size of the sliding contact surface, it can be useful to provide several small recesses within the sliding contact surface instead of a single comparatively large recess.

The recess can be configured as at least one channel which penetrates the contact element and forms an opening in the sliding contact surface and in a lateral surface of the contact element facing away from the sliding contact surface. The channel then connects the sliding contact surface with the relevant lateral surface. In contrast to a blind hole, it is also possible to drain the oily fluid through the contact element through the channel. Fluid can then collect in the channel and exit again at the opening in the lateral surface. It can thus be prevented that with continuous conveyance or movement of oily fluid through the shaft an accumulation forms in the recess.

A ratio of a cross-section or diameter of the channel in the sliding contact surface to a cross-section or diameter of the channel in a lateral surface, in particular a side surface or a rear surface, of the contact element can be $\geq 1.1$. Consequently, the cross-section of the channel in the sliding contact surface is at least 10% larger than the cross-section of the channel in the lateral surface. The cross-section in the sliding contact surface and the cross-section in the lateral surface can, for example, be configured as a circle or diameter. A circle can be formed particularly easily by drilling.

In a longitudinal section relative to the contact element, the channel can be configured to be conical with stepped diameters and/or with channel sections running longitudinally and/or transversely relative to one another.

Consequently, the channel can be formed as a through bore running from the sliding contact surface to the rear surface or with a transverse bore from the side surface of the contact element, which crosses a bore located in the sliding contact surface or opens therein.

A ratio of an area of the recess within the sliding contact surface to the sliding contact surface can be $\geq 0.08$. With this ratio, it can be ensured that the sliding contact surface is still sufficiently large to dissipate electrical currents. At the same time, a possible film of oily fluid can be significantly reduced via the recess.

The contact element can be at least partially accommodated and displaceable in a guide device of the contacting device, wherein the contact element can be electrically conductively connected to the guide device and/or a holding element of the machine, and wherein the contact element can be pre-tensioned in the direction of the rotor contact surface by means of a spring element, wherein the guide device can be connected to a stator part of the machine in an electrically conducting manner.

The contact element can be electrically conductively connected to the guide device or a holding element of the machine by means of a preferably low-resistance strand, wherein the strand can preferably be pressed or stamped into the contact element at one end and can preferably be welded or soldered or crimped to the guide device at the other end. The guide device is preferably made at least partially from a low-resistance material, in particular from metal, preferably aluminium, aluminium alloy, copper and/or brass.

In a particularly preferred embodiment of the contacting device according to the disclosure, the contact element is substantially fabricated from a carbon-metal mixture, in particular from a mixture of graphite and a metal having good electrical conductivity, wherein silver is preferably provided as the metal at least in the area of the sliding contact surface of the contact element and wherein copper is preferably provided as the metal in a rear area of the contact element, wherein the contact element is preferably free of copper in the area of the sliding contact surface. The proportion of metal in the contact element is preferably at least 30 vol. %. In the area of the sliding contact surface, the contact element is therefore preferably free of copper since this metal, in connection with the passage of current, can lead to catalytic changes in the oily fluid, which as a consequence can negatively change the physical properties of this fluid. For this reason, the shaft or the slip ring of the machine according to the disclosure, described in further detail below, is also free of copper or has only a small amount of copper added, at least in the area where the shaft or the slip ring makes contact with the contact element.

In order to keep a system resistance as low as possible under all operating conditions, the resistance of the contacting device according to the disclosure should also be selected to be low. The resistance of the entire device can be kept low as a result of the above-described embodiments with low-resistance materials and a contact element made of a metal-carbon mixture. On the other hand, the system resistance is significantly influenced by the voltage drop between the shaft surface and the sliding contact surface of the contact element. This takes up the largest proportion of the overall system. Therefore, this should also be kept low. In order to ensure this with the continuous oiling, a high specific contact pressure of the contact element on the shaft is advantageous on the one hand. This value should be selected to be at least 10 N/cm$^2$. On the other hand, no electrochemical reactions in connection with the oily fluid should occur on the contact element in the area of the sliding contact surface. This is ensured in particular by a silver-graphite material in an area of the contact element that wears out over the entire lifetime.

The contact element can be a rod-shaped brush, in which case the sliding contact surface can preferably be configured to be rectangular or square. The said brush can be manufactured by compression moulding and subsequent thermal treatment.

A cross-section of the contact element can be at least partially conical, in particular bow-shaped. It can be provided that the cross-section which runs conically or in a truncated cone shape extends in the direction opposite to a direction of rotation or a preferred direction of rotation of the shaft or the slip ring. The formation of a run-up edge for oily fluid on the contact element can thus be avoided. The oily fluid can then be displaced along the lateral surfaces of the contact element, which are then designed to taper, so that it is more difficult for a film to form from the oily fluid on the sliding contact surface.

The machine according to the disclosure, in particular an electric drive motor or transmission, is configured with a rotor part having a shaft and/or a slip ring and a contacting device according to the disclosure, wherein the contact element of the contacting device contacts the shaft or the slip ring with its sliding contact surface to form a sliding contact. The advantages already described above of an improved contacting of the shaft or the slip ring with the contact element when an oily fluid is present in the area of the sliding contact surface are achieved with the machine. As a result, the contacting device can be stored completely in the oily fluid, in particular engine or gear oil. The oily fluid is preferably provided in particular in a space between the shaft or the slip ring and the guide device, which space is bridged by the contact element. It is therefore also conceivable that the oily fluid is sprayed, dripped or applied in the form of a mist onto the contacting device, in particular the contact element of the contacting device.

According to one embodiment of the machine, the contact element can contact a peripheral surface of the shaft or of the slip ring. In this embodiment, the contact element can preferably be geometrically tapered in cross-section against the preferred direction of rotation of the shaft to be contacted or the slip ring in order to suppress electrical contact losses caused by floating between the shaft or the slip ring and the contact element.

Furthermore, a longitudinal axis of the contact element can be arranged to run at a distance relative to an axis of rotation of the shaft. The longitudinal axis of the contact element is then not aligned with the axis of rotation of the shaft, so that the contact element is positioned on the shaft or the slip ring so as to run obliquely or transversely relative to the axis of rotation. The contact element can then be arranged at an obtuse angle counter to a direction of rotation or a preferred direction of rotation of the shaft or the slip ring in such a manner that oily fluid located on the shaft or the slip ring can be scraped from the shaft or the slip ring by a cutting edge thus formed by the contact element. By scraping off the fluid, any formation of a lubricating film on the sliding contact surface can also be suppressed.

According to a further embodiment, the contact element can contact an end face of the shaft or of the slip ring, wherein the contact element can preferably be arranged substantially coaxially to the shaft. Such a shaft earthing is preferable for avoiding contact losses, since the axial run-out of the rotating shaft is usually low. By positioning the contact element close to the point of rotation of the shaft, the circumferential speeds are minimized and the actual running distance viewed over the lifetime of the contact element is also reduced enormously. The wear of the contact element, which usually correlates proportionally with the running distance, is directly influenced by this. By minimizing the running distance, the wear of the contact element remains low, with the result that the loss of power of the spring element over the total wear length of the contact element is also only minimal. This makes it possible, for example, to use a cost-effective helical compression spring already mentioned above. In addition, the low circumferential speed near the axis of rotation of the shaft or slip ring reduces the risk of the formation of a continuous, electrically insulating lubricating film, with the result that the contact pressure can be kept lower than would be required at high circumferential speed. Another advantage of the front-side contact of the shaft or the slip ring close to the axis of rotation is the minimization of the frictional torque due to the small radial distance from the point of rotation. Even with a very high frictional force, the frictional torque remains small as the product of frictional force×running radius. Subsequently, in connection with the angular velocity (equivalent to rotational speed), the friction power remains low and the system losses therefore small.

At least in a space surrounding the sliding contact on the shaft or the slip ring and the contact element, oily fluid, in particular engine or gear oil, can be provided.

Further advantageous embodiments of a machine are obtained from the descriptions of the features of the dependent claims relating back to the device Claim 1.

When using a contacting device according to the disclosure for transmitting electric currents from a rotor part of a machine configured with a shaft and/or a slip ring, the contacting device comprises a contact element for forming an electrically conductive sliding contact between a sliding contact surface of the contact element provided for forming the sliding contact and a rotor contact surface of a shaft or the slip ring, wherein a recess is formed in the sliding contact surface, wherein the contact element is wetted at least partially, in particular at least in the region of the sliding contact surface, with an oily fluid.

For the advantages of use, reference is made to the description of the advantages of the contacting device according to the disclosure. Further advantageous embodiments of a use are obtained from the descriptions of the features of the dependent claims relating back to the device Claim 1.

Further features are obtained from the following descriptions of the figures in connection with the drawings and the dependent claims. Here, the individual features can be implemented alone or in combination with one another.

In the following drawings:

FIG. 1 shows a shaft with a contact element according to a first embodiment;

FIG. 2 shows a shaft with a contact element according to a second embodiment;

FIG. 3 shows a shaft with a contact element according to a third embodiment;

FIG. 4 shows a side view of a contact element;

Figure 5:
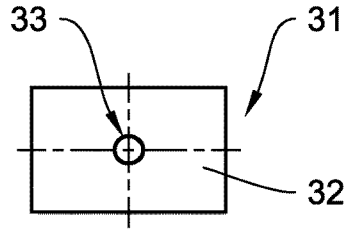
FIG. 5 shows a plan view of a contact element according to a first embodiment.

FIG. 1 shows a purely schematic diagram of a contact element 10 of a contacting device, not shown here, on a shaft 11 of a machine, also not shown in detail. The shaft 11 is wetted with an oily fluid, which is also not visible, and rotates in the direction of the arrow 12. The contact element 10 forms a sliding contact surface 13 and abuts against a rotor contact surface 14 formed by a circumferential surface 15 of the shaft 11. The sliding contact surface 13 and the rotor contact surface 14 together form a sliding contact 16 between the shaft 11 and the contact element 10, via which electrical currents can be dissipated from the shaft 11. A recess, which cannot be seen here, is formed within the sliding contact surface 13.

In principle, in all of the described embodiments, a rotor contact surface can be formed by a slip ring.

FIG. 2 shows a contact element 17 which abuts against the shaft 11, wherein a longitudinal axis 18 of the contact element 17 is arranged to run at a distance A relative to an axis of rotation 19 of the shaft 11. In particular, a cutting edge 20 is thus formed on the contact element 17 with which oily fluid can be scraped off the circumferential surface 15.

FIG. 3 shows a contact element 21 on a shaft 22, wherein the contact element 21 contacts the shaft 22 on an axial side 23. Here, too, the contact element 21 has a recess, not shown in more detail, in a sliding contact surface 24.

FIG. 4 shows a contact element 25 which substantially consists of a carbon-metal mixture, in particular a mixture of graphite and metal. In a front area 27 of the contact element 25 having a sliding contact surface 26, a metal silver is provided, with copper being provided as a metal in a rear area 28 of the contact element 25. A strand 30 is attached to the contact element 25 on a rear surface 29 of the contact element 25. A recess, not shown in detail here, is formed within the sliding contact surface 26.

Figure 6:
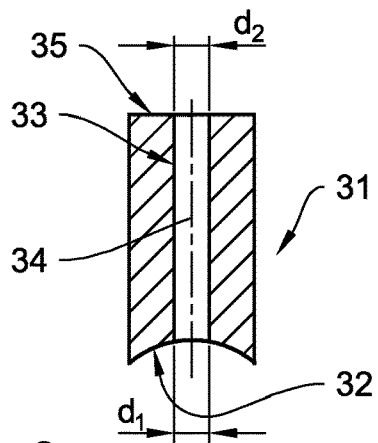
FIG. 6 shows a longitudinal sectional view of the contact element from FIG. 5.

A combined view of FIGS. 5 and 6 shows a contact element 31 with a sliding contact surface 32 within which a bore 33 is formed, which forms a channel 34 which penetrates the contact element 31. The bore 33 forms a diameter d1 in the sliding contact surface 32 which corresponds to a diameter d2 on a rear surface 35 of the contact element 31. The bore 33 accordingly runs coaxially through the contact element 31.

Figure 7:
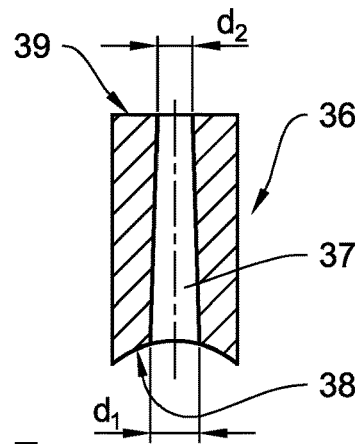
FIG. 7 shows a longitudinal sectional view of a second embodiment of a contact element.

FIG. 7 shows a contact element 36 in which a channel 37 is configured to be conical. A diameter d1 in a sliding contact surface 38 is configured to be larger in relation to a diameter d2 in a rear surface 35 of the contact element 36.

Figure 8:
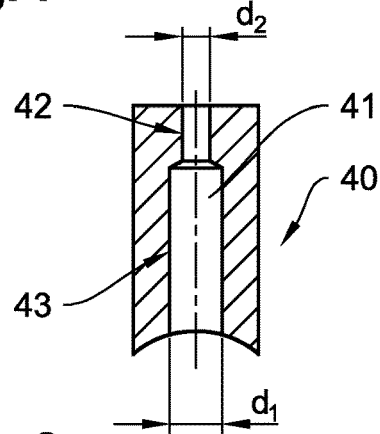
FIG. 8 shows a longitudinal sectional view of a third embodiment of a contact element.

FIG. 8 shows a contact element 40 with a channel 41 which is formed from a first bore 42 and a second bore 43. The first bore 42 has a comparatively smaller diameter d2 than the second bore 43 having the diameter d1.

Figure 9:
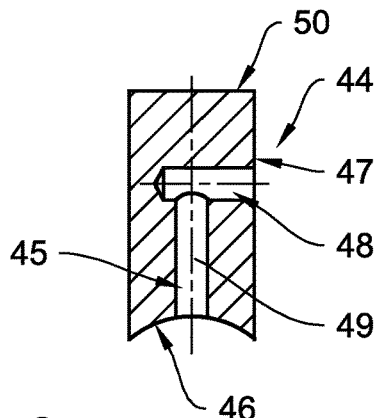
FIG. 9 shows a longitudinal sectional view of a fourth embodiment of a contact element.

FIG. 9 shows a contact element 44 with a blind hole 45 in a sliding contact surface 46. Another blind hole 48 that crosses the blind hole 45 is formed in a side face 47 of the contact element 44. A discharge of oily fluid to the side surface 47 is possible via a channel 49 configured in this way. This is particularly useful when a rear face 50 of the contact element 44 cannot be provided with an opening for structural reasons.

Figure 10:
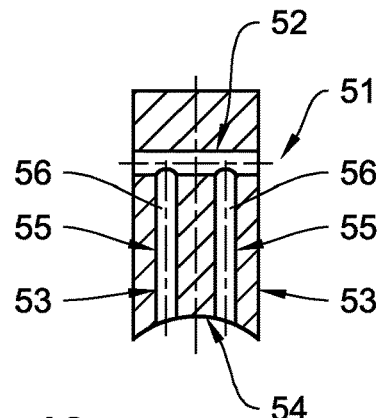
FIG. 10 shows a longitudinal sectional view of a fifth embodiment of a contact element.

FIG. 10 shows a contact element 51 with a through hole 52 which connects two side surfaces 53 of the contact element 51. Two blind holes 55 are formed in a sliding contact surface 54, both of which open into the through hole 52. Two channels 56 are thus formed.

Figure 11:
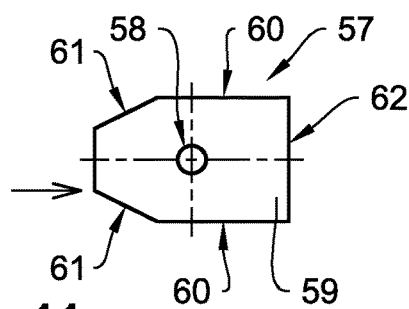
FIG. 11 shows a plan view of a sixth embodiment of a contact element.

FIG. 11 shows a contact element 57 with a bore 58 in a sliding contact surface 59, wherein parallel side surfaces 60 here are configured to be partially conical with a slope 61, relative to a cross-section 62 of the contact element 57. When oily fluid flows against the sliding contact surface 59, this can be displaced at least partially in the area of the slopes 61 along the side surfaces 60.

Figure 12:
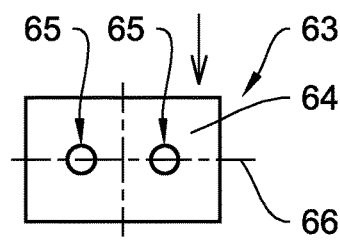
FIG. 12 shows a plan view of a seventh embodiment of a contact element.

FIG. 12 shows a contact element 63 in which two bores 65 are formed in a sliding contact surface 64. The two bores 65 lie on a transverse axis 66 of the sliding contact surface 64 relative to a direction of movement of a shaft not shown here.

The invention claimed is:

1. Contacting device for transmitting electric currents from a rotor part of a machine configured with a shaft and/or a slip ring, comprising a contact element to form an electrically conductive slip contact between a sliding contact surface of the contact element provided to form the slip contact and a rotor contact surface of the shaft or the slip ring, wherein a recess is formed in the sliding contact surface, wherein the contact element is wetted with an oily fluid at least in the area of its sliding contact surface.

2. Contacting device according to claim 1, wherein the oily fluid is engine oil and/or gear oil.

3. Contacting device according to claim 1, wherein the recess within the sliding contact surface is formed by at least one bore or a slit.

4. Contacting device according to claim 1, wherein two or more recesses are formed within the sliding contact surface.

5. Contacting device according to claim 1, wherein the recess is formed as at least one channel that passes through the contact element and forms respectively one opening in the sliding contact surface and in a lateral surface of the contact element facing away from the sliding contact surface.

6. Contacting device according to claim 5, wherein a ratio of a cross-section of the channel in the sliding contact surface to a cross-section of the channel in the lateral surface of the contact element is ≥1.1.

7. Contacting device according to claim 5, wherein the channel is configured to be conical in a longitudinal section, with reduced diameters and/or with channel sections running longitudinally and/or transversely relative to one another.

8. Contacting device according to claim 1, wherein a ratio of an area within the sliding contact surface to the sliding contact surface is ≥0.08.

9. Contacting device according to claim 1, wherein the contact element is accommodated and displaceable at least partially in a guide device of the contacting device, wherein the contact element is connected in an electrically conducting manner to the guide device and/or a holding element of the machine and wherein the contact element is pre-tensioned by means of a spring element in the direction of the rotor contact surface, wherein the guide device can be connected in an electrically conducting manner to a stator part of the machine.

10. Contacting device according to claim 9, wherein the contact element is connected in an electrically conducting manner to the guide device or a holding element of the machine by means of a low-resistance strand, wherein the strand is pressed or stamped in the contact element at one end and is welded or soldered or crimped with the guide device at the other end.

11. Contacting device according to claim 1, wherein the contact element is substantially fabricated from a mixture of graphite and metal, wherein the total volume fraction of the metal is preferably at least 30 vol. %, wherein at least in a front region of the contact element having the sliding contact surface, silver is provided as metal and wherein in a rear region of the contact element copper is provided as metal, wherein the contact element is free from copper in the region of the sliding contact surface.

12. Contacting device according to claim 1, the contact element is a rod-shaped brush, wherein the sliding contact surface is configured to be rectangular or square.

13. Contacting device according to claim 1, wherein a cross-section of the contact element is configured to be at least partially conical.

14. Machine comprising a rotor part having a shaft and/or a slip ring as well as a contacting device according to claim 1, wherein the contact element of the contacting device contacts the shaft or the slip ring with its sliding contact surface to form a sliding contact.

15. Machine according to claim 14, wherein the contact element contacts a circumferential surface of the shaft or the slip ring.

16. Machine according to claim 14, wherein a longitudinal axis of the contact element is arranged to run at a distance relative to an axis of rotation of the shaft.

17. Machine according to claim 14, wherein the contact element contacts a front face of the shaft or the slip ring, wherein the contact element is arranged substantially coaxially to the shaft.

18. Machine according to claim 14, wherein oily fluid is provided at least in a space surrounding the slip contact at the shaft or the slip ring and the contact element.

19. Use of a contacting device for transmitting electric currents from a rotor part of a machine formed with a shaft and/or a slip ring, comprising a contact element for forming an electrically conducting slip contact between a sliding contact surface of the contact element provided to form the slip contact and a rotor contact surface of the shaft or the slip ring, wherein a recess is formed in the sliding contact surface, wherein the contact element is wetted with an oily fluid at least in the region of its sliding contact surface.

* * * * *